(12) United States Patent
Azuma

(10) Patent No.: US 6,954,761 B2
(45) Date of Patent: Oct. 11, 2005

(54) ENTERPRISE INFORMATION FILTERING SYSTEM, ENTERPRISE INFORMATION FILTERING METHOD, AND STORAGE MEDIUM STORING THEREIN PROGRAM

(75) Inventor: Tomihiko Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 243 days.

(21) Appl. No.: 10/032,078

(22) Filed: Dec. 31, 2001

(65) Prior Publication Data

US 2002/0091674 A1 Jul. 11, 2002

(30) Foreign Application Priority Data

Jan. 9, 2001 (JP) ........................................ 2001-001935

(51) Int. Cl.⁷ ............................................. G06F 17/30
(52) U.S. Cl. ...................................................... 707/102
(58) Field of Search ........................... 707/100, 104.1, 707/102, 1, 200; 705/8, 9, 5

(56) References Cited

U.S. PATENT DOCUMENTS

| | | | | |
|---|---|---|---|---|
| 5,455,945 A | * | 10/1995 | VanderDrift | 707/2 |
| 5,813,009 A | * | 9/1998 | Johnson et al. | 707/100 |
| 5,873,088 A | * | 2/1999 | Hayashi et al. | 707/100 |
| 5,920,858 A | * | 7/1999 | Kitabayashi et al. | 707/4 |
| 6,067,548 A | * | 5/2000 | Cheng | 707/103 R |
| 6,083,277 A | * | 7/2000 | Fowlow et al. | 717/107 |
| 6,314,427 B1 | * | 11/2001 | Goldman et al. | 707/100 |
| 6,366,926 B1 | * | 4/2002 | Pohlmann et al. | 707/104.1 |
| 2002/0072929 A1 | | 6/2002 | Azuma | |
| 2002/0082894 A1 | | 6/2002 | Azuma | |

FOREIGN PATENT DOCUMENTS

| | | | |
|---|---|---|---|
| JP | 8-65335 A | 3/1996 | |
| JP | 8-314827 A | 11/1996 | |
| JP | 183391 A | 6/2002 | |
| JP | 2002-183421 A | 6/2002 | |

* cited by examiner

Primary Examiner—Greta Robinson
(74) Attorney, Agent, or Firm—Foley & Lardner

(57) ABSTRACT

Organization definition information M31 is stored in an organization definition information storage unit 31, contents M33 to be provided to a user is stored in a contents storage unit 33 and filter definition information M22 which is sent from a filter definition information generation unit 22 is stored in a filter definition information storage unit 32. A filtering execution unit 23 obtains information M10c on the contents, in which necessary information is stored, from the user, obtains filter definition information M32 on the contents, specified by the information M10c, from the filter definition information storage unit 32, obtains user's organization definition information M31, specified by filter definition information M32, from an organization definition information storage unit 31, builds a filter, and executes filtering to the contents M33.

6 Claims, 21 Drawing Sheets

FIG. 2

| CATEGORY | ITEM | DESCRIPTION |
|---|---|---|
| ORGANIZATION-WIDE INFORMATION | ORGANIZATION HIERARCHY | HIERARCHY OF SUB-ORGANIZATIONS |
| | SUB-ORGANIZATION | ORGANIZATION NAME, BUSINESS AREA, FUNCTIONAL FIELD, RESPONSIBILITY, AUTHORITY, HEAD/CHIEF, ETC. |
| PERSONAL INFORMATION | PERSONAL ASSIGNMENT | DIVISION/SECTION ASSIGNED, MANAGEMENT SPAN, PRIMARY JOB/CONCURRENT JOB |
| | EMPLOYEE ID | NUMBER, CODE, ETC., UNIQUELY IDENTIFYING A PERSON |
| | NAME | PERSONAL NAME |
| | JOB TITLE | MANAGER, FACTORY MANAGER, HEAD OF DIVISION, CHIEF OF SECTION, CLERK, ETC. |
| | JOB TYPE | SALES, DEVELOPMENT, CUSTOMER SUPPORT, ETC. |
| | CHARGE | PRODUCT, CUSTOMER, AREA, PROCESS, ETC. |
| | FUNCTION | CONSULTING, ORDER ACCEPTANCE, SALES PLANNING, RESULT INVESTIGATION, ETC. |
| | RESPONSIBILITY | PERIODIC REPORT, COUNTERMEASURES AGAINST EXCEPTIONS, SECURITY MAINTENANCE REGULATIONS, ETC. |
| | KNOWLEDGE | QUALIFICATION, EXPERTISE, SPECIAL FIELD, LANGUAGE ABILITY, ETC. |
| | EXPERIENCE | PROJECT, CUSTOMER, TECHNICAL FIELD, AREA, ETC. |
| | ADDRESS INFORMATION | ADDRESS, TELEPHONE NUMBER, FAX NUMBER, E-MAIL, ETC. |

FIG. 4

| ATTRIBUTE | VALUE |
|---|---|
| EMPLOYEE ID | X05 |
| NAME | TOMIHIKO AZUMA |
| JOB TITLE | PERSON IN CHARGE |
| CHARGE | VIDEO |
| PASSWORD | xxxxxxxx |

FIG. 5

```
<?xml version="1.0"?>
<COMPANY><ORGANIZATION NAME>COMPANY A</ORGANIZATION NAME>
   <PERSON><EMPLOYEE ID>X01</EMPLOYEE ID>
      <NAME>ICHIRO KAWATO</NAME>
      <JOB TITLE>PRESIDENT</JOB TITLE>...
   </PERSON>
   <DIVISION><ORGANIZATION NAME>DIVISION A</ORGANIZATION NAME>
      <PERSON><EMPLOYEE ID>X02</EMPLOYEE ID>
         <NAME>JIRO ANZAI</NAME>
         <JOB TITLE>HEAD OF DIVISION</JOB TITLE>
      </PERSON>
      <SECTION><ORGANIZATION NAME>SECTION A1</ORGANIZATION NAME>
         <PERSON><EMPLOYEE ID>X04</EMPLOYEE ID>
            <NAME>SHIRO KITAYAMA</NAME>
            <JOB TITLE>CHIEF OF SECTION</JOB TITLE>
         </PERSON>
         <PERSON><EMPLOYEE ID>X05</EMPLOYEE ID>
            <NAME>TOMIHIKO AZUMA</NAME>
            <JOB TITLE>CLERK</JOB TITLE>
            <CHARGE>VIDEO</CHARGE>
            <PASSWORD>XXXXXXXX</PASSWORD>
         </PERSON>
         <PERSON>... </PERSON>
      </SECTION>
      <SECTION><ORGANIZATION NAME>SECTION A2</ORGANIZATION NAME>
         <PERSON>... </PERSON>
      </SECTION>
   </DIVISION>

<DIVISION><ORGANIZATION NAME>DIVISION B</ORGANIZATION NAME>
      <PERSON><EMPLOYEE ID>X03</EMPLOYEE ID>
         <NAME>SABURO MINAMI</NAME>
         <JOB TITLE>HEAD OF DIVISION</JOB TITLE>
      </PERSON>
      <SECTION><ORGANIZATION NAME>SECTION B1</ORGANIZATION NAME>
         <PERSON><EMPLOYEE ID>X10</EMPLOYEE ID>
            <NAME>MAMORU KAGAYA</NAME>
            <JOB TITLE>CHIEF OF SECTION</JOB TITLE>...
         </PERSON>
         <PERSON>... </PERSON>
      </SECTION>
      <SECTION><ORGANIZATION NAME>SECTION B2</ORGANIZATION NAME>
         <PERSON>... </PERSON>
      </SECTION>
   </DIVISION>
</COMPANY>
```

FIG. 6

| TAG | MEANING | START | END |
|---|---|---|---|
| COMPANY | DEFINITION OF COMPANY | <COMPANY> | </COMPANY> |
| DIVISION | DEFINITION OF DIVISION | <DIVISION> | </DIVISION> |
| SECTION | DEFINITION OF SECTION | <SECTION> | </SECTION> |
| ORGANIZATION NAME | DEFINITION OF ORGANIZATION NAME | <ORGANIZATION NAME> | </ORGANIZATION NAME> |
| PERSON | DEFINITION OF PERSON | <PERSON> | </PERSON> |
| EMPLOYEE ID | PERSONAL EMPLOYEE ID | <EMPLOYEE ID> | </EMPLOYEE ID> |
| NAME | PERSONAL NAME | <NAME> | </NAME> |
| JOB TITLE | PERSONAL JOB TITLE | <JOB TITLE> | </JOB TITLE> |
| CHARGE | ONE TAKEN IN CHARGE OF BY PERSON | <CHARGE> | </CHARGE> |
| PASSWORD | PERSONAL PASSWORD | <PASSWORD> | </PASSWORD> |

FIG. 9

```
dn: o= COMPANY AB
objectclass: organization
o: COMPANY AB dn: uid=X01,o= COMPANY AB
objectclass: inetOrgPerson
uid: X01
cn: ICHIRO KAWATO
title: PRESIDENT
...

dn: ou=DIVISION A,o=COMPANY AB
objectclass: organizationalunit
ou: DIVISION A dn: uid=X02,ou=DIVISION A,o=COMPANY AB
objectclass: inetOrgPerson
uid: X02
cn: JIRO ANZAI
title: HEAD OF DIVISION
...

dn: ou=SECTION A1,ou=DIVISION A,o=COMPANY AB
objectclass: organizationalunit
ou: SECTION A1 dn: uid=X04,ou=SECTION A1,ou=DIVISION A,  o= COMPANY AB
objectclass: inetOrgPerson
uid: X04
cn: SHIRO KITAYAMA
title: CHIEF OF SECTION
...
```

```
dn: uid=X05,ou= SECTION A1,ou=DIVISION A,
objectclass: inetOrgPerson   ,o=COMPANY AB
uid: X05
cn: TOMIHIKO AZUMA
title: CHARGE
product: VIDEO
userpassword: xxxxxxxx dn: uid=X06,ou=SECTION A1,ou=DIVISION A,
                               o= COMPANY AB
...

dn: ou=SECTION A2,ou=DIVISION A,
                     o= COMPANY AB
...

dn: ou=DIVISION B,o= COMPANY AB
objectclass: organizationalunit
ou: DIVISION B dn: uid=X03,ou= DIVISION B,o=COMPANY AB
objectclass: inetOrgPerson
uid: X03
cn: SABURO MINAMI
title: HEAD OF DIVISION dn: ou= SECTION B1,ou=DIVISION B,o=
objectclass: organizationalunit   COMPANY AB
ou: SECTION B1
...
```

FIG. 10

| ATTRIBUTE | MEANING |
|---|---|
| dn | OBJECT IDENTIFIER |
| objectclass | OBJECT CLASS |
| o | COMPANY NAME |
| ou | ORGANIZATION NAME |
| uid | PERSONAL EMPLOYEE ID |
| cn | PERSONAL NAME |
| title | PERSONAL JOB TITLE |
| product | PRODUCT TAKEN IN CHARGE OF BY PERSON |
| userpassword | PERSONAL PASSWORD |

FIG. 11a

| ORGANIZATION | HIGHER LEVEL ORGANIZATION |
|---|---|
| COMPANY AB | — |
| DIVISION A | COMPANY AB |
| DIVISION B | COMPANY AB |
| SECTION A1 | DIVISION A |
| SECTION A2 | DIVISION A |
| SECTION B1 | DIVISION B |
| SECTION B2 | DIVISION B |

FIG. 11b

| EMPLOYEE ID | ORGANIZATION | NAME | JOB TITLE | PRODUCT | PASSWORD |
|---|---|---|---|---|---|
| X01 | COMPANY AB | ICHIRO KAWATO | PRESIDENT | — | xxxxxxxx |
| X02 | DIVISION A | JIRO ANZAI | HEAD OF DIVISION | — | xxxxxxxx |
| X03 | DIVISION B | SABURO MINAMI | HEAD OF DIVISION | — | xxxxxxxx |
| X04 | SECTION A1 | SHIRO KITAYAMA | HEAD OF SECTION | — | xxxxxxxx |
| X05 | SECTION A1 | TOMIHIKO AZUMA | PERSON IN CHARGE | VIDEO | xxxxxxxx |
| X06 | SECTION A1 | HIROYUKI KUBOTA | PERSON IN CHARGE | TV | xxxxxxxx |
| X07 | SECTION A2 | SHOJI YOSHIKAWA | HEAD OF SECTION | — | xxxxxxxx |
| X08 | SECTION A2 | KATSUHITO TAKATUKI | PERSON IN CHARGE | REFRIGERATOR | xxxxxxxx |
| X09 | SECTION A2 | KEIJI YODA | PERSON IN CHARGE | WASHING MACHINE | xxxxxxxx |
| X10 | SECTION B1 | MAMORU KAGAYA | HEAD OF SECTION | | xxxxxxxx |
| X11 | SECTION B1 | HIROAKI YONEYAMA | PERSON IN CHARGE | TELEPHONE | xxxxxxxx |
| X12 | SECTION B1 | TADASHI KAWANO | PERSON IN CHARGE | FAX | xxxxxxxx |
| X13 | SECTION B2 | HIDEO ITO | HEAD OF SECTION | — | xxxxxxxx |
| X14 | SECTION B2 | AKIRA KANDA | PERSON IN CHARGE | PC | xxxxxxxx |
| X15 | SECTION B2 | HIROKO NAGAYAMA | PERSON IN CHARGE | PRINTER | xxxxxxxx |

FIG. 13

| CONTENTS | FILTERING CONDITION |
|---|---|
| SALES RESULT | SALES RESULT. PRODUCT = ORGANIZATION DEFINITION. CHARGE |
| OVERTIME WORK RESULT | OVERTIME WORK RESULT. EMPLOYEE ID = ORGANIZATION DEFINITION. EMPLOYEE ID |
| ... | ... |

FIG. 15

| EMPLOYEE ID | USER | FILTER |
|---|---|---|
| X04 | KITAYAMA | SALES RESULT. PRODUCT = 'VIDEO' OR SALES RESULTS. PRODUCT = 'TV' |
| X03 | MINAMI | SALES RESULT. PRODUCT = 'TELEPHONE' OR SALES RESULTS. PRODUCT = 'FAX' OR SALES RESULTS. PRODUCT = 'PC' OR SALES RESULTS. PRODUCT = 'PRINTER' |
| X14 | KANDA | SALES RESULT. PRODUCT = 'PC' |

FIG. 16

| PRODUCT | APRIL | MAY | JUNE | JULY | AUGUST | SEPTEMBER |
|---|---|---|---|---|---|---|
| VIDEO | 101 | 33 | 25 | 44 | 59 | 125 |
| TV | 74 | 32 | 57 | 99 | 112 | 43 |
| REFRIGERATOR | 23 | 46 | 67 | 88 | 93 | 61 |
| WASHING MACHINE | 34 | 37 | 52 | 60 | 35 | 38 |
| TELEPHONE | 145 | 109 | 120 | 156 | 204 | 107 |
| FAX | 35 | 27 | 67 | 78 | 28 | 37 |
| PC | 176 | 143 | 133 | 178 | 109 | 124 |
| PRINTER | 32 | 31 | 35 | 54 | 66 | 24 |

FIG. 17a

| PRODUCT | APRIL | MAY | JUNE | JULY | AUGUST | SEPTEMBER |
|---|---|---|---|---|---|---|
| VIDEO | 101 | 33 | 25 | 44 | 59 | 125 |
| TV | 74 | 32 | 57 | 99 | 112 | 43 |

FIG. 17b

| PRODUCT | APRIL | MAY | JUNE | JULY | AUGUST | SEPTEMBER |
|---|---|---|---|---|---|---|
| TELEPHONE | 145 | 109 | 120 | 156 | 204 | 107 |
| FAX | 35 | 27 | 67 | 78 | 28 | 37 |
| PC | 176 | 143 | 133 | 178 | 109 | 124 |
| PRINTER | 32 | 31 | 35 | 54 | 66 | 24 |

FIG. 17c

| PRODUCT | APRIL | MAY | JUNE | JULY | AUGUST | SEPTEMBER |
|---|---|---|---|---|---|---|
| PC | 176 | 143 | 133 | 178 | 109 | 124 |

FIG. 18a

| ORGANIZATION | HIGHER ORGANIZATION |
|---|---|
| COMPANY AB | — |
| DIVISION A | COMPANY AB |
| DIVISION B | COMPANY AB |
| DIVISION C | COMPANY AB |
| SECTION A1 | DIVISION A |
| SECTION A2 | DIVISION A |
| SECTION B1 | DIVISION B |
| SECTION B2 | DIVISION B |
| SECTION C1 | DIVISION C |

FIG. 18b

| EMPLOYEE ID | ORGANIZATION | NAME | JOB TITLE | PRODUCT | PASSWORD |
|---|---|---|---|---|---|
| X01 | COMPANY AB | ICHIRO KAWATO | PRESIDENT | — | xxxxxxxx |
| X02 | DIVISION A | JIRO ANZAI | HEAD OF DIVISION | — | xxxxxxxx |
| X03 | DIVISION B | SABURO MINAMI | HEAD OF DIVISION | — | xxxxxxxx |
| X16 | DIVISION C | SATOSHI KUROIWA | HEAD OF DIVISION | — | xxxxxxxx |
| X13 | SECTION A1 | HIDEO ITO | HEAD OF SECTION | — | xxxxxxxx |
| X05 | SECTION A1 | TOIHIKO AZUMA | PERSON IN CHARGE | VIDEO | xxxxxxxx |
| X06 | SECTION A1 | HIROYUKI KUBOTA | PERSON IN CHARGE | TV | xxxxxxxx |
| X09 | SECTION A1 | KEIJI YOUDA | PERSON IN CHARGE | DVD PLAYER | xxxxxxxx |
| X07 | SECTION A2 | SHOJI YOSHIKAWA | HEAD OF SECTION | — | xxxxxxxx |
| X08 | SECTION A2 | KATSUHITO TAKATSUKI | PERSON IN CHARGE | REFRIGERATOR | xxxxxxxx |
| X10 | SECTION B1 | MAMORU KAGAYA | HEAD OF SECTION | TELEPHONE | xxxxxxxx |
| X11 | SECTION B1 | HIROAKI YONEYAMA | PERSON IN CHARGE | FAX | xxxxxxxx |
| X12 | SECTION B1 | TADASHI KAWANO | PERSON IN CHARGE | — | xxxxxxxx |
| X04 | SECTION B2 | SHIRO KITAYAMA | HEAD OF SECTION | — | xxxxxxxx |
| X14 | SECTION B2 | AKIRA KANDA | PERSON IN CHARGE | PC | xxxxxxxx |
| X15 | SECTION B2 | HIROKO NAGAYAMA | PERSON IN CHARGE | PRINTER | xxxxxxxx |
| X17 | SECTION C1 | MEGUMI SATO | HEAD OF SECTION | — | xxxxxxxx |
| X18 | SECTION C1 | KOUICHI OKAMOTO | PERSON IN CHARGE | AIR CONDITIONER | xxxxxxxx |
| X19 | SECTION C1 | MASAYUKI ORITO | PERSON IN CHARGE | DRIER | xxxxxxxx |

FIG. 19

| EMPLOYEE ID | USER | FILTER |
|---|---|---|
| X16 | KUROIWA | SALES RESULT. PRODUCT = 'AIR CONDITIONER' OR SALES RESULT. PRODUCT = 'DRIER' |
| X17 | SATO | SALES RESULT. PRODUCT = 'AIR CONDITIONER' OR SALES RESULT. PRODUCT = 'DRIER' |
| X13 | ITO | SALES RESULT. PRODUCT = 'VIDEO' OR SALES RESULT PRODUCT = 'TV' OR SALES RESULT. PRODUCT = 'DVD PLAYER' |
| X04 | KITAYAMA | SALES RESULT. PRODUCT = 'PC' OR SALES RESULT PRODUCT = 'PRINTER' |

FIG. 20a

| PRODUCT | APRIL | MAY | JUNE | JULY | AUGUST | SEPTEMBER |
|---|---|---|---|---|---|---|
| AIR CONDITIONER | 10 | 12 | 56 | 89 | 78 | 30 |
| DRIER | 10 | 15 | 47 | 58 | 23 | 20 |

FIG. 20b

| PRODUCT | APRIL | MAY | JUNE | JULY | AUGUST | SEPTEMBER |
|---|---|---|---|---|---|---|
| VIDEO | 101 | 33 | 25 | 44 | 59 | 125 |
| TV | 74 | 32 | 57 | 99 | 112 | 43 |
| DVD PLAYER | 8 | 12 | 14 | 25 | 17 | 12 |

FIG. 20c

| PRODUCT | APRIL | MAY | JUNE | JULY | AUGUST | SEPTEMBER |
|---|---|---|---|---|---|---|
| PC | 176 | 143 | 133 | 178 | 109 | 124 |
| PRINTER | 32 | 31 | 35 | 54 | 66 | 24 |

ENTERPRISE INFORMATION FILTERING SYSTEM, ENTERPRISE INFORMATION FILTERING METHOD, AND STORAGE MEDIUM STORING THEREIN PROGRAM

FIELD OF THE INVENTION

The present invention relates to an enterprise information system. More particularly, the present invention relates to an enterprise information filtering system, an enterprise information filtering method, and a storage medium storing therein a computer program that are preferably practiced in such a case where each of plural users (for example, employees), who are in partial charge of a business, may obtain information concerned with his or her own job.

BACKGROUND OF THE INVENTION

Conventionally, for a plurality of users, each being in partial charge in a business, to obtain information on their respective jobs from an enterprise information filtering system, each user has individually used the enterprise information filtering system to search for information or has individually defined a filter to obtain information he or she requires.

An enterprise information filtering system, comprised of an input device 1, a data processor 2, a storage device 3, and an output device 4, as shown in FIG. 21, heretofore has been known. Referring to FIG. 21, the input device 1, based on operation by a user, generates and outputs two types of information: one is an organization definition information $M1a$ such as the enterprise's organization hierarchy, personal organization, and personal job definition, and the other is an authentication information $M1b$ identifying that the user is an authorized user of the enterprise information filtering system. The data processor 2 comprises view defining means $2a$ and search executing means $2b$. The storage device 3 comprises view definition storage $3a$ and contents storage $3b$. The view defining means $2a$ receives the organization definition information $M1a$, converts it to a user-desired view (data format), and generates and outputs organization definition information $M2a$. The view definition storage $3a$ receives organization definition information $M2a$ and stores it as organization definition information $M3a$. The contents storage $3b$ stores, in advance, contents $M3b$ that contains information to be provided by the enterprise information filtering system to the user. The search executing means $2b$ searches the contents $M3b$ based on the organization definition information $M3a$ to generate and output a search result $M2b$ required by the user. The output device 4 receives the search result $M2b$ and presents it to the user.

SUMMARY OF THE DISCLOSURE

However, the conventional enterprise information filtering system described above has problems described below.

That is, in some cases, the contents $Mb3$ stored in the contents storage $3b$ do not correspond to a management span which specifies a range that the user must be responsible for management. This sometimes requires the user to search the huge-amount contents $Mb3$ for information for which the user must have management responsibility. Therefore, each time the user references information, much man-hour for filtering is required to select information. In addition, information cannot be filtered from the organization definition information $M3a$ based on the users management span. This means that the user must individually define a specific view and, when there are personal changes or organization changes in the enterprise, the user must individually modify organization definition information $M3a$ accordingly. This presents another drawback that a huge amount of man-hour is required for the modification task.

Accordingly, it is an object of the present invention to provide an enterprise information filtering system, an enterprise information filtering method, and a storage medium storing therein an enterprise information filtering control program that eliminate the need for a user to individually search for information included in his or her management responsibility range and that allow the user to quickly take action even when there are personal changes or organization changes in the enterprise.

To achieve the foregoing and other objectives, an enterprise information filtering system, in accordance with one aspect of the present invention, comprises means for filtering solely information, which is included in a management span of a post to which a user belongs, from information on an enterprise, using management span information that is included in organization definition information containing definition information used to define each element constituting an enterprise organization and that represents a management responsibility range of each post.

An enterprise information filtering system, in accordance with another aspect of the present invention, comprises: an organization definition information storage unit for storing organization-wide information that represents an internal organization structure of an enterprise and personal information that represents information necessary for performing a job of a user as organization definition information; a contents storage unit for storing contents including information to be provided to the user; filter definition information generating means for receiving said organization definition information and said contents to make an attribute constituting said contents and an attribute constituting said organization definition information as a filtering condition, and for generating filter definition information with said filtering condition and an identifier of said contents as a set; a filter definition information storage unit for storing the filter definition information; and filtering means for obtaining filter definition information corresponding to contents, which is specified by the user, from said filter definition information storage unit, for obtaining organization definition information, which is specified in the filter definition information and which is necessary for a user, from said organization definition information storage unit to build a filter, and for performing filtering operation to the contents stored in said contents storage unit using said filter to extract solely information included in a management span of the user as a filtering result.

In the enterprise information filtering system, in accordance with the present invention, in a case where a management responsibility range of the user undergoes a change, the filtering means obtains organization definition information, which corresponds to said change, from the organization definition information storage unit, adds the organization definition information to the filter, and performs filtering operation to said contents using a finally-built filter to extract the filtering result.

A method for filtering enterprise information, in accordance with another aspect of the present invention, comprises: filtering solely information, which is included in a management span of a post to which a user belongs, from information on an enterprise, by using management span information that is included in organization definition information containing definition information used to define each element constituting an enterprise organization and that represents a management responsibility range of each post.

A method for filtering enterprise information, in accordance with another aspect of the present invention, comprises the steps of:

(a) storing organization-wide information that represents an internal organization structure of an enterprise and personal information that represents information necessary for executing a job of a user as organization definition information in a first storage unit;

(b) storing contents including information to be provided to the user in a second storage unit;

(c) receiving said organization definition information and said contents from said first and second storage unit respectively, making an attribute constituting said contents and an attribute constituting said organization definition information as a filtering condition, and for generating filter definition information with said filtering condition and an identifier of said contents as a set;

(d) storing the filter definition information in a third storage unit; and (e) obtaining filter definition information corresponding to contents, which is specified by the user, from said third storage unit, obtaining organization definition information, which is specified in the filter definition information and which is necessary for a user, to build a filter, and for performing filtering operation to said contents stored in said second storage unit using said filter to extract solely information included in a management span of the user as a filtering result.

The method, in accordance with the present invention, further comprises the steps of: in a case where a management responsibility range of the user undergoes a change, (f) obtaining organization definition information, which corresponds to the change, from the organization definition information storage unit, (g) adding the organization definition information to the filter, and (h) performing filtering operation to said contents using a finally-built filter to extract the filtering result.

A storage medium, in accordance with another aspect of the present invention, stores therein a computer program that causes a computer to execute filtering operation for extracting solely information, which is included in a management span of a post to which a user belongs, from information on an enterprise, by using management span information that is included in organization definition information containing definition information used to define each element constituting an enterprise organization and that represents a management responsibility range of each post.

A storage medium, in accordance with another aspect of the present invention, stores therein a computer program that causes a computer to executes the steps of:

(a) storing organization-wide information that represents an internal organization structure of an enterprise and personal information that represents information necessary for executing a job of a user as organization definition information in a first storage unit;

(b) storing contents including information to be provided to the user in a second storage unit;

(c) receiving said organization definition information and said contents from said first and second storage unit respectively, making an attribute constituting said contents and an attribute constituting said organization definition information as a filtering condition, and for generating filter definition information with said filtering condition and an identifier of said contents as a set;

(d) storing the filter definition information in a third storage unit; and (e) obtaining filter definition information corresponding to contents, which is specified by the user, from said third storage unit, obtaining organization definition information, which is specified in the filter definition information and which is necessary for a user, to build a filter, and for performing filtering operation to the contents stored in said second unit using said filter to extract solely information included in a management span of the user as a filtering result.

The storage medium, in accordance with another aspect of the present invention, stores therein a computer program that causes a computer to executes the steps of: in case where a management server responsibility range of the user undergoes a change, (f) obtaining organization definition information, corresponding to the change, from said organization definition information storage unit, (g) adding the organization definition information to the filter, and (h) performing filtering operation to said contents using a finally-built filter to extract the filtering result.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 is a diagram showing an example of organization definition information M31 stored in an organization definition information storage unit 31 shown in FIG. 1;

FIG. 4 is a diagram showing an example of personal information shown in FIG. 2;

FIG. 5 is a diagram showing an example of XML coded organization definition information shown in FIGS. 3 and 4;

FIG. 6 is a diagram showing the definition of an XML tag set shown in FIG. 5;

FIG. 9 is a diagram showing the definition of LDAP attributes in FIG. 8;

FIG. 10 is a diagram showing an example of LDIF-represented personal organization definition information shown in FIG. 8;

FIGS. 11a and 11b are diagrams showing an example of organization definition information in FIGS. 3 and 4 represented in a table formats;

FIG. 13 is a diagram showing an example of filter definition information stored in a filter definition information storage unit 32;

FIG. 15 is a diagram showing an example of a filter built by a filtering execution unit 23;

FIG. 16 is a diagram showing an example of sales result data;

FIGS. 17(a), 17(b), and 17(c) are diagrams showing filtering results;

FIGS. 18(a) and 18(b) are diagrams showing results on which personnel changes and organization changes to the organization definition information in FIGS. 11(a) and 11(b) are reflected;

FIG. 19 is a diagram showing filters finally built;

FIGS. 20(a), 20(b) and 20(c) are diagrams showing filtering results; and

PREFERRRED EMBODIMENTS OF THE INVENTION

An embodiment of the present invention will now be described with reference to the drawings.

Figure 1:
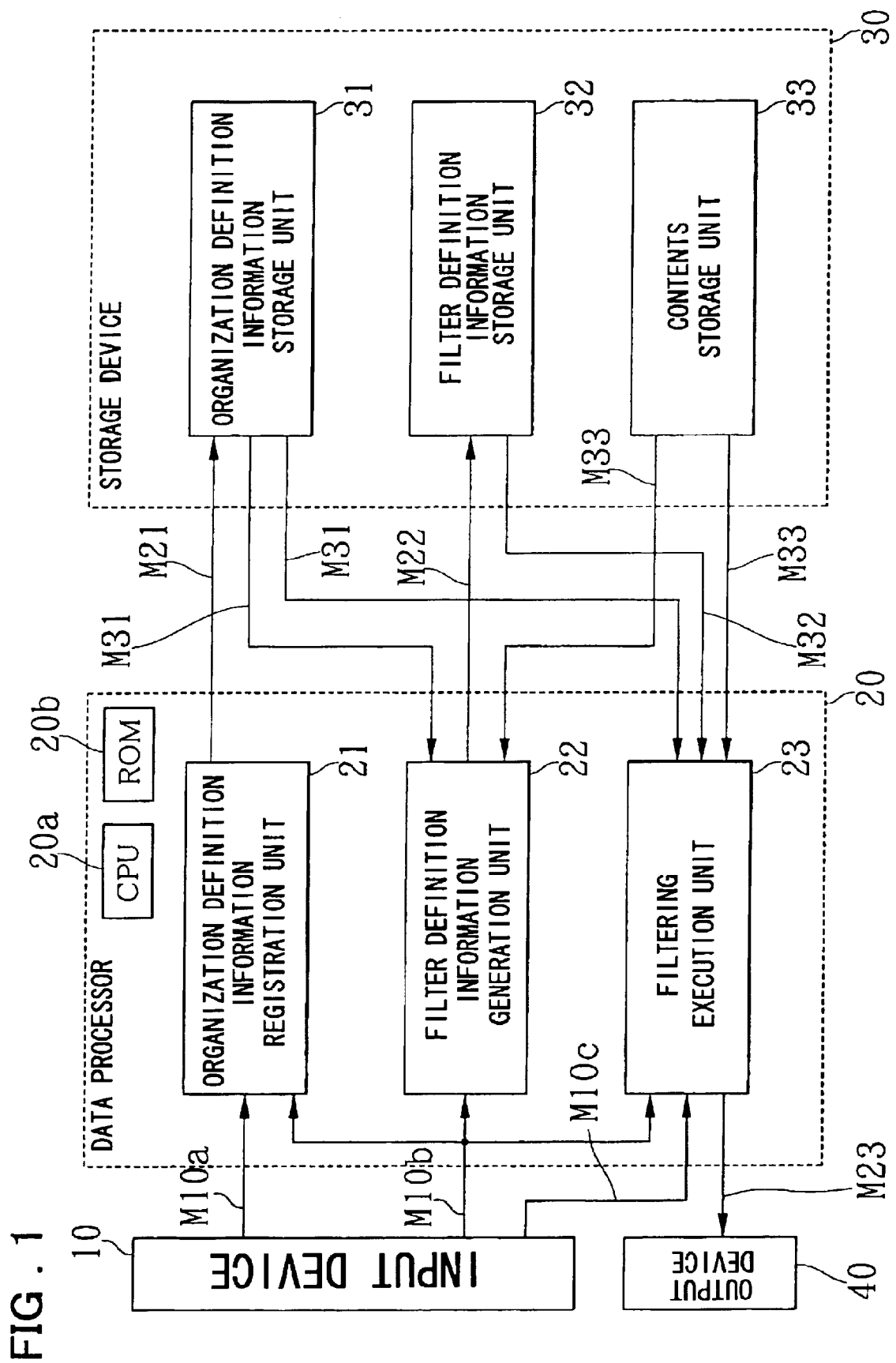
FIG. 1 is a block diagram showing the configuration of an enterprise information filtering system in an embodiment of the present invention.

FIG. 1 shows the configuration of an enterprise information filtering system in accordance with an embodiment of the present invention.

As shown in FIG. 1, the enterprise information filtering system in this embodiment comprises an input device 10, a data processor 20, a storage device 30, and an output device 40. The input device 10, made of such as the keyboard of a personal computer, based on the operation by a user, generates and outputs the following three types of information: organization definition information M10a (for example, organization hierarchy of the enterprise, personnel distribution, and personal job definition) that contains information defining the elements constituting the enterprise organization, authentication information M10b identifying that the user is an authorized user of the enterprise information filtering system, and information M10c on the contents containing information necessary for the user.

The data processor 20 includes a central processing unit (hereinafter termed CPU) 20a that controls the data processor 20 in its entirety and a storage medium (for example, made up of a read-only memory, hereinafter termed ROM) 20b that stores therein a control program that operates the CPU 20a. The data processor 20 comprises an organization definition information registration unit 21, filter definition information generating means (for example, filter definition information generation unit) 22, and filtering means (for example, filtering execution unit) 23. The storage device 30 comprises an organization definition information storage unit 31, a filter definition information storage unit 32, and a contents storage unit 33. The organization definition information registration unit 21 receives organization definition information M10a and authentication information M10b, converts them respectively into the information of a predetermined format, and sends the converted information to the organization definition information storage unit 31 as organization definition information M21.

The organization definition information storage unit 31 receives the organization definition information M21 and stores it as organization definition information M31. The contents storage unit 33 stores, in advance, contents M33 that includes information that the enterprise information filtering system provides to a user. The filter definition information generation unit 22 receives the authentication information M10b and verifies that the user is an authorized user of the enterprise information filtering system. Then, from the user, the filter definition information generation unit 22 receives an identifier of contents to be used for filtering and a filtering condition composed of the attribute of the contents and the attribute of the organization definition information, sets the identifier and the filtering condition as one information set, and sends the information set to the filter definition information storage unit 32 as filter definition information M22 for use in filtering information. The filter definition information storage unit 32 receives and stores the filter definition information M22.

The filtering execution unit 23 receives the authentication information M10b and checks if the user is an authorized user of the enterprise information filtering system. Then, the filtering execution unit 23 obtains information M10c on the contents containing necessary information from the user via the input device 10, obtains filter definition information M32 on the contents, specified by the information M10c, from the filter definition information storage unit 32, obtains user's organization definition information M31, specified by the filter definition information M32, from the organization definition information storage unit 31, and builds a filter. In addition, when the user's management responsibility range changes (for example, a new subordinate is added to the user's management responsibility range), the filtering execution unit 23 obtains all direct and indirect organization definition information M31 of the subordinate from the organization definition information storage unit 31, adds the obtained information to the filter, executes filtering for the contents M33 using the filter that has been built, extracts a filtering result M23, and sends the extracted result to the output device 40. The output device 40, such as the display of a personal computer, displays the filtering result M23. The input device 10 and the data processor 20, and the output device 40 and the data processor 20, are mutually connected via a communication line, for example, via the Internet.

FIG. 2 shows an example of organization definition information stored in the organization definition information storage unit 31 in FIG. 1.

As shown in FIG. 2, the organization definition information is composed of organization-wide information representing the definition of the whole organization and personal information on the individuals belonging to the organization. The organization-wide information is composed of organization hierarchy information indicating the hierarchy of the sub-organizations, information on the sub-organizations such as factories or divisions provided for each business area or each functional field, and personnel distribution information for the whole organization. The personal information is composed of an employee ID for identifying uniquely a person, a personal name, information on job titles such as a head of a division, a chief of a section and the like, information on job types such as sales and development, information on a product or a customer the person is in charge, information on the function to be executed as a job, information on the duty to be carried out in the organization, information on personal qualifications and technical knowledge, information on experiences such as projects, customers and the like the person was in charge in the past, and information on addresses including telephone number, e-mail address and the like.

Figure 3:
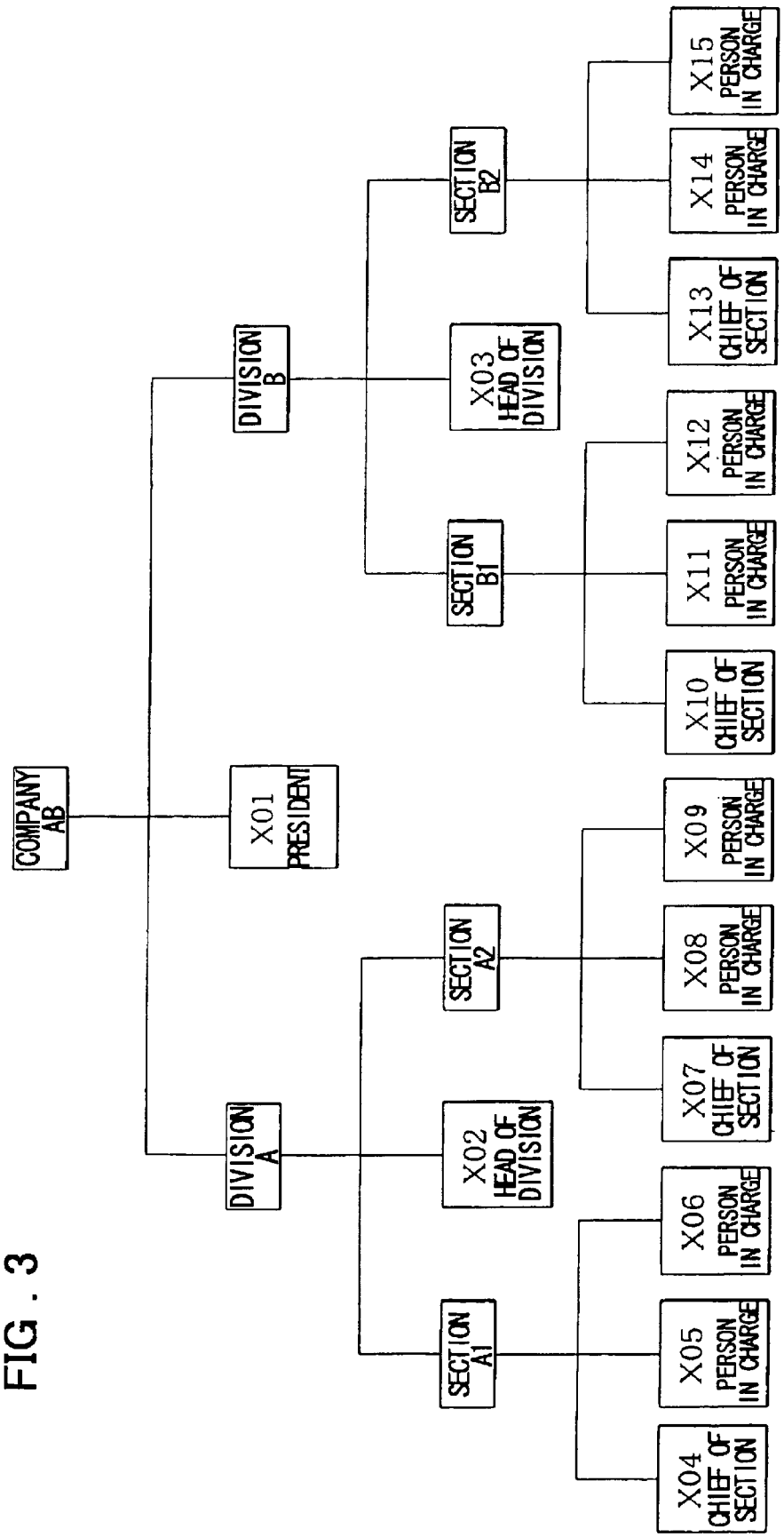
FIG. 3 is a diagram showing an example of information on organization hierarchy and personal assignment shown in FIG. 2.

FIG. 3 shows an example of information on the organization hierarchy and personal assignment shown in FIG. 2.

In FIG. 3, the organization hierarchy of an enterprise "company AB" is represented in the reverse tree structure with the organization hierarchy being indicated by the positional relation in the figure. That is, "company AB" has "division A" and "division B", "division A" has "section A1" and "section A2", and "division B" has "section B1" and "section B2". In addition, a person with an employee ID "X01" is the president of "Company AB", a person with an employee ID "X02" is the head of "division A", and a person with an employee ID "X03" is the head of "division B". A person with an employee ID "X04", a person with an employee ID "X07", a person with an employee ID "X10", and a person with an employee ID "X13" are the chief of "Section A1", "Section A2", "Section B1", and "Section B2", respectively. A person with an employee ID "X05" and a person with an employee ID "X06" are assigned to "Section A1", a person with an employee ID "X08" and a person with an employee ID "X09" are assigned to "Section A2", a person with an employee ID "X11" and a person with an employee ID "X12" are assigned to "Section B1", and a person with an employee ID "X14" and a person with an employee ID "X15" are assigned to "Section B2", respectively, all with the job title "person in charge".

FIG. 4 shows an example of the personal information shown in FIG. 2.

In FIG. 4, the employee ID, name, job title, charge, and password (that is, user's authentication information) are listed as the personal information attribute.

Figure 7B:
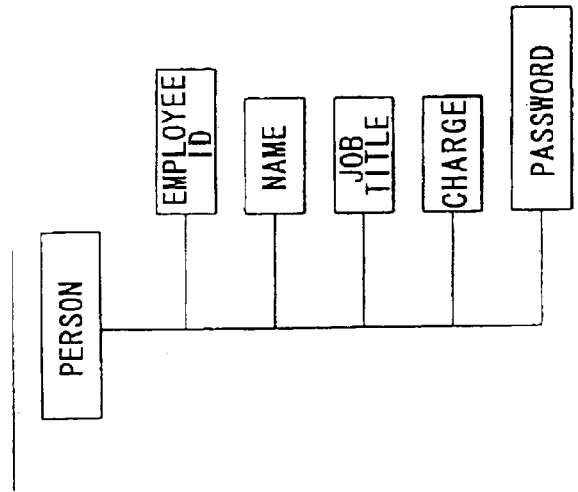
FIGS. 7A and 7B are diagrams showing the structure of an XML document shown in FIG. 5.
Figure 7A:
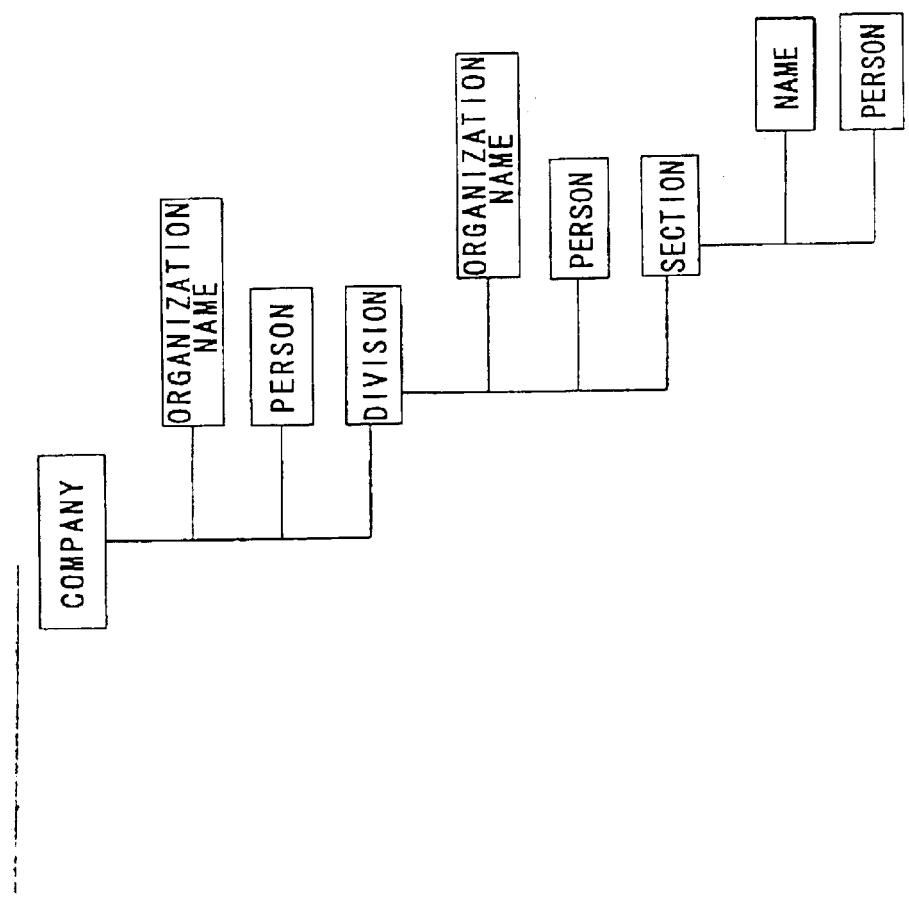

FIG. 5 is an example of XML (Extensible Markup Language) source code which represents the organization definition information shown in FIGS. 3 and 4. FIG. 6 shows the definition of a set of XML tags used in FIG. 5. FIGS. 7A and 7B show the structure of the XML document shown in FIG. 5.

In FIG. 5, the company is defined in the area between the tag <company> and the tag </company>, a division is defined in an area between the tag <division> and the tag </division>, and a section is defined in an area between tag <section> and tag </section>, all based on the definition shown in FIG. 6. In addition, in FIG. 5, information on the sub-organization hierarchy and the personnel distribution are represented by the inclusive relation of the tags, based on the definition of the structure shown in FIGS. 7A and 7B.

For example, the area between the tag <company> and the tag </company> which represents the definition of "company AB" includes the area between the tag <person> and the tag </person> which represents the president, the area between the tag <division> and the tag </division> which represents "division A", and the area between the tag <division> and the tag </division> which represents "division B". This indicates that the president of "company AB" has the employee ID "X01" and that "company AB" is composed of "division A" and "division B".

Similarly, the area between the tag <division> and the tag </division> which represents the definition of "division A" includes the area between the tag <person> and the tag </person> which represents the head of the division with the employee ID "X02" and the areas, each between the tag <section> and the tag </section>, which represent "section A1" and "section A2". Also, the area between the tag <division> and the tag </division> which represents the definition of "division B" includes the area between the tag <person> and the tag </person> which represents the head of the division with the employee ID "X03" and the areas, each between the tag <section> and the tag </section>, which represent "section B1" and "section B2". The area between the tag <section> and the tag </section> which represents the definition of "section A1" includes a plurality of areas, each surrounded by the tag <person> and the tag </person>, which represent the personnel distribution in "section A1".

Figure 8:
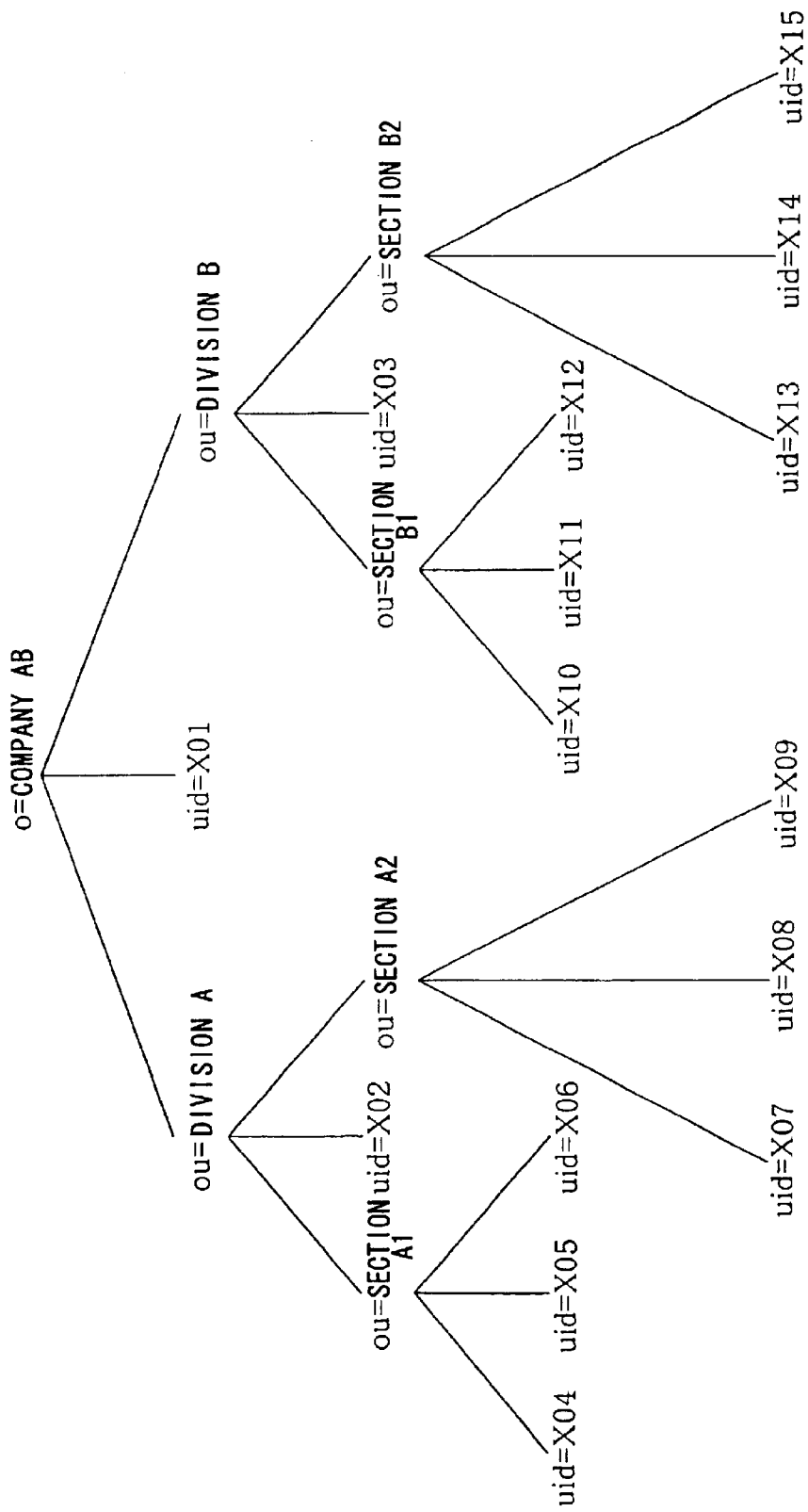
FIG. 8 is a diagram showing an example of organization definition information in FIGS. 3 and 4 represented as a LDAP server directory tree.

FIG. 8 shows an example of the organization definition information in FIGS. 3 and 4 represented as a directory tree in the LDAP (Lightweight Directory Access Protocol) server, and FIG. 9 shows the definition of LDAP attributes used in FIG. 8.

In FIG. 8, the company is represented by the identifier "o=Company AB", and sub-organizations such as a division and a section are represented by identifiers such as "ou=Division A" and "ou=Section A1", based on the definition shown in FIG. 9. Individual persons are represented by identifiers using employee IDs, for example, "uid=X01".

FIG. 10 shows an example of organization definition information on the persons in FIG. 8, represented in LDIF (LDAP Data Interchange Format).

In FIG. 9, organization definition information on the persons in FIG. 8 is represented by attributes such as "cn", "title", "product", and "user-password".

FIGS. 11a and 11b are examples of organization definition information in FIGS. 3 and 4 which are represented in the table format. FIG. 11a illustrates the organization structure of "Company AB", and FIG. 11b illustrates the personal assignment and the personal information.

FIGS. 11a and 11b indicate that the leader of an organization, such as the head of a division or the chief of a section is responsible for managing all members belonging to the organization including him or herself. For example, "Anzai", the head of "division A", has management responsibility for those belonging to "division A", that is, those employees with the employee IDs "X02", "X04", "X05", "X06", "X07", "X08", and "X09". Similarly, "Kitayama", the chief of "section A1", has management responsibility for those belonging to "section A1", that is, those with employee IDs "X04", "X05", and "X06".

Figure 12:
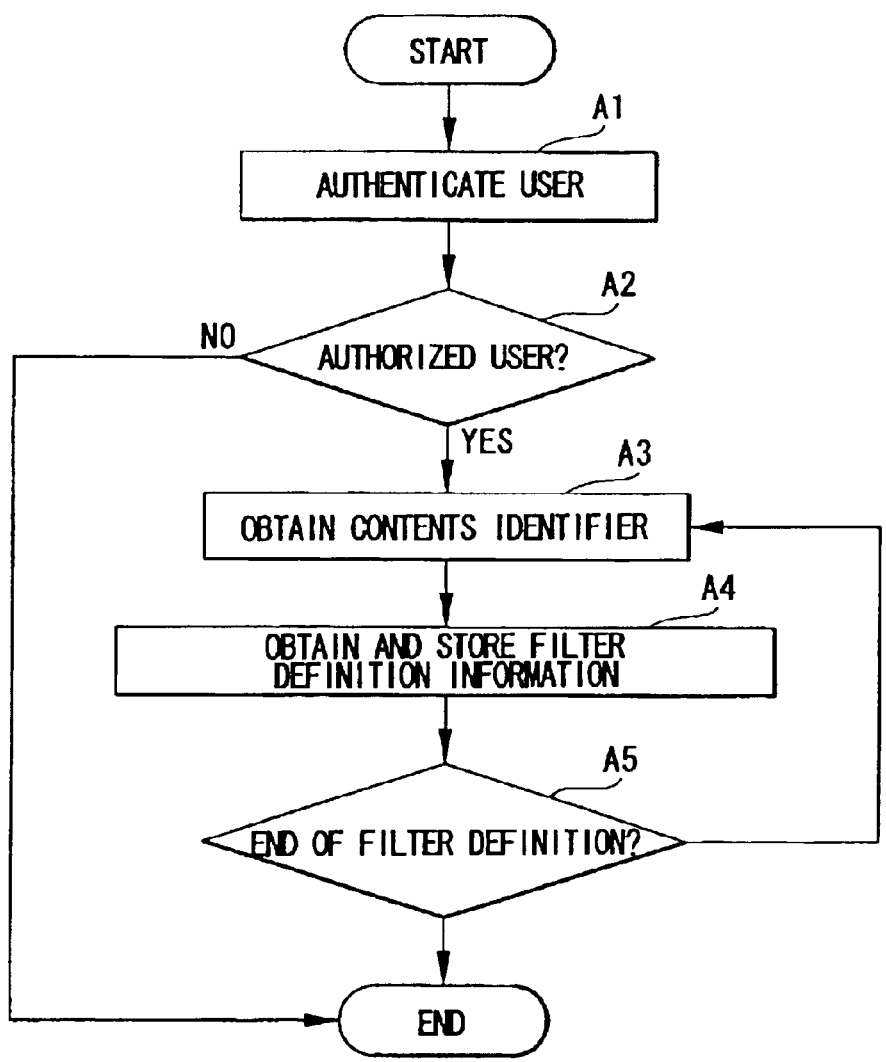
FIG. 12 is a flowchart showing the operation of filter definition information registration in the enterprise information filtering system shown in FIG. 1.

FIG. 12 is a flowchart showing how filter definition information is registered in the enterprise information filtering system shown in FIG. 1. FIG. 13 shows an example of filter definition information stored in the filter definition information storage unit 32.

With reference to those figures, how filter definition information is registered in the enterprise information filtering system according to the embodiment of the present invention will be described.

As shown in FIG. 12, a user enters an employee ID and a password from the input device 10, and the entered employee ID and the password are supplied to the filter definition information generation unit 22 for authentication (step A1). Then the verification that the user is an authorized user is performed by utilizing personal information stored in the organization definition information storage unit 31 to check (step A2). If the user is not an authorized user, the operation stops immediately. If the user is verified as an authorized user, the filter definition information generation unit 22 obtains, via the input device 10, the identifier of the contents to be used for filtering (step A3). Next, the filter definition information generation unit 22 obtains a set of the attribute constituting contents and the attribute constituting the organization definition information M31 from the user via the input device 10 and registers this set into the filter definition information storage unit 32 as the filtering condition (step A4, filter definition information registration step, and filter definition information storing step). If, after registering one piece of filer definition information, another piece of filter definition information must be registered, steps A3, A4, and A5 are repeated. When all filter definition information is registered, the operation is terminated (step A5).

The filter definition information stored in the filter definition information storage unit 32 is the filter definition information on the contents "sales result", the contents "overtime work result" and the like shown in FIG. 13, while contents are stored in the contents storage unit 33. "Sales result" is the identifier which designates the sales result information stored in the contents storage unit 33, and "organization definition" is the identifier which designates the organization definition information M31 stored in the organization definition information storage unit 31. With regards to the contents "sales results", a filtering condition is defined to select solely information where the attribute value of "product" of "sales result" is equal to "charge" of "organization definition". Similarly, with regards to the contents "overtime work result", a filtering condition is defined to select solely information where "employee ID" of "overtime work result" is equal to "employee ID" of "organization definition".

Figure 14:
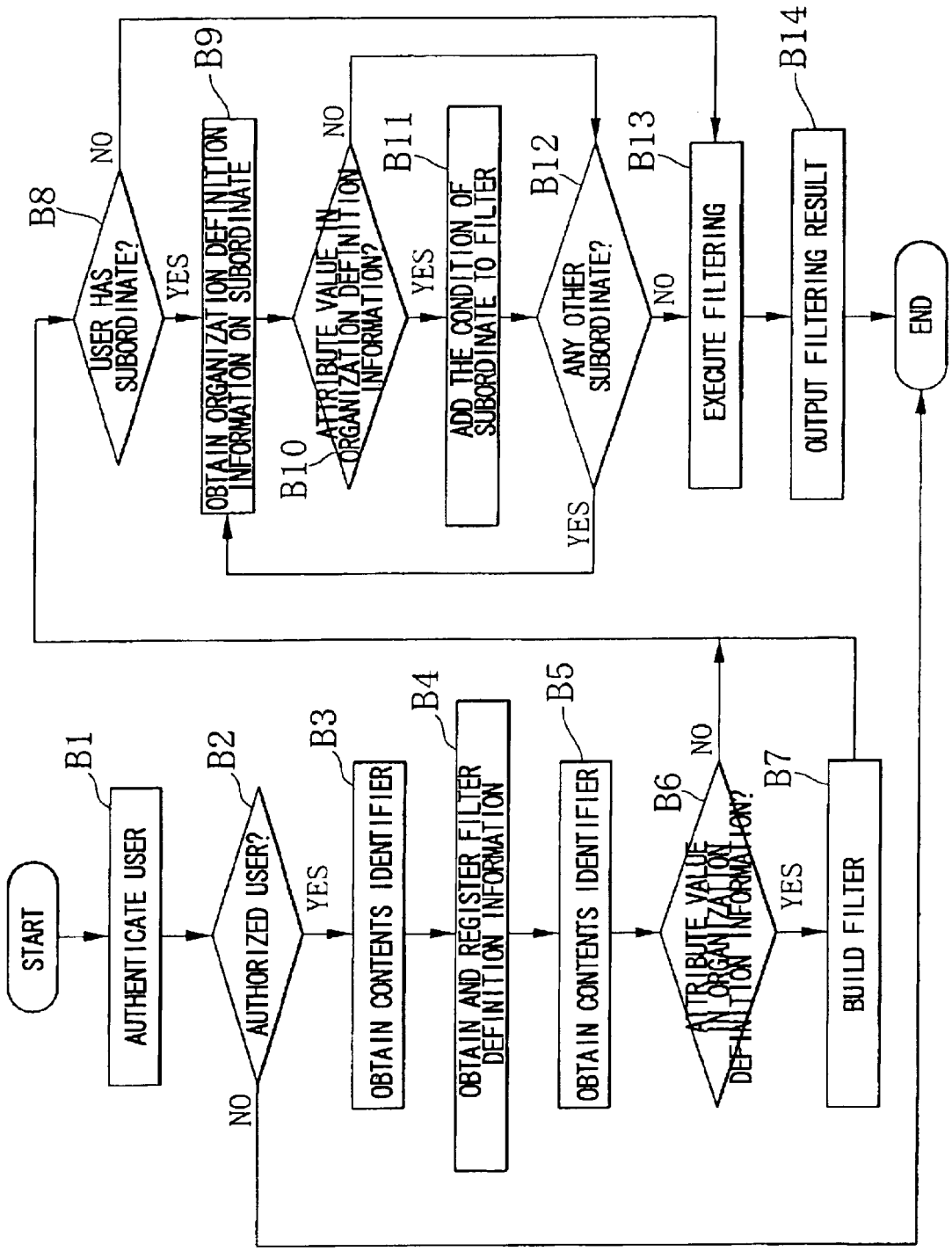
FIG. 14 is a flowchart showing the operation of filtering in the enterprise information filtering system shown in FIG. 1.
Figure 21:
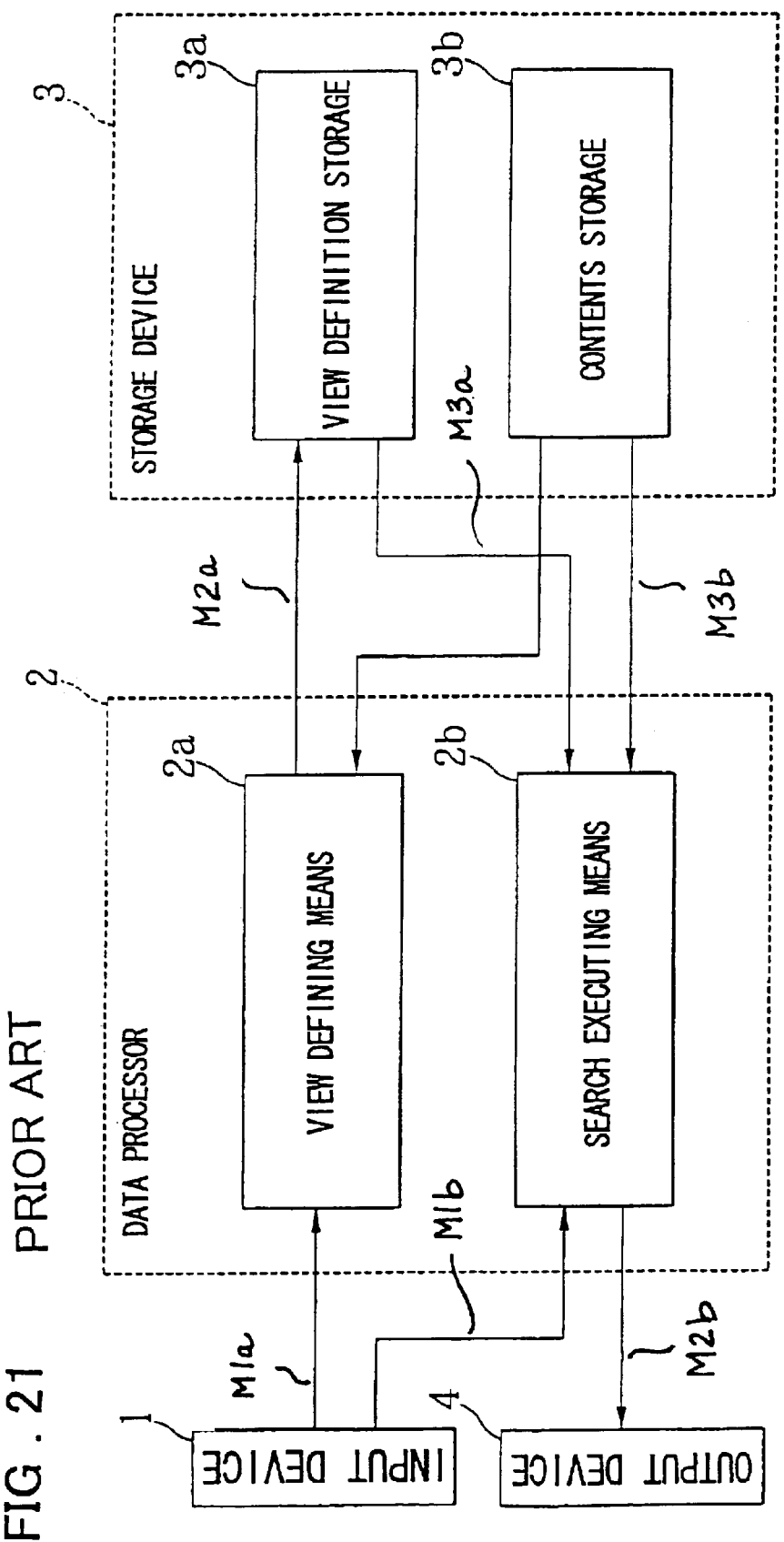
FIG. 21 is a block diagram showing the configuration of a conventional enterprise information filtering system.

FIG. 14 is a flowchart showing the filtering operation of the enterprise information filtering system shown in FIG. 1, FIG. 15 is a diagram showing an example of a filter built by the filtering execution unit 23, FIG. 16 is a diagram showing an example of sales result data, and FIG. 17 is a diagram showing the filtering result.

With reference to these figures, an enterprise information filtering method in the enterprise information filtering system according to the embodiment of the present invention will be described.

Organization-wide information representing the organization of the enterprise and personal information representing information necessary for jobs to be carried out by the users are stored, in advance, in the organization definition information storage unit 31 (organization definition information storing step). Also, contents including information to be supplied to the user are stored, in advance, in the contents storage unit 33 (contents storing step).

Next, as shown in FIG. 14, the user enters an employee ID and a password from the input device 10, and the entered employee ID and the password are fed to the filtering execution unit 23 for performing an authentication of the user (step B1). The filtering execution unit 23 uses authentication information stored in the organization definition information storage unit 31 to check if the user is an authorized user (step B2). If the user is not an authorized user, the operation stops immediately. If the user is verified as an authorized user, the filtering execution unit 23 obtains, via the input device 10, the identifier of the contents in which information corresponding to the user is stored (step B3), obtains filter definition information corresponding to the identifier of the specified contents from the filter definition information storage unit 32 (step B4), and obtains user's organization definition information M31, specified in the filtering condition in the filter definition information, from the organization definition information storage unit 31 (step B5). Next, the filtering execution unit 23 checks if a value is allocated to the attribute of the organization definition information M31 specified in the filtering condition (step B6). If a value is not allocated, the filtering execution unit 23 does no operation; if a value has been allocated, the filtering execution unit 23 builds a filter by utilizing the attribute value of the organization definition information M31 (step B7, filtering execution step). A filter is built by replacing a part, defined by the attribute of the organization definition in the filtering condition, with an actual attribute value.

Assuming that the organization definition information M31 in FIG. 11 is stored in the organization definition information storage unit 31 and that the filter definition information in FIG. 13 is stored in the filter definition information storage unit 32, the operation executed in steps B1 to B7 (in FIG. 14) of the filtering execution unit 23 will be described more in detail.

When "Kitayama" with the employee ID "X04" in FIG. 11b specifies "sales result" as the contents identifier, the filtering execution unit 23 obtains "sales result. product=organization definition. charge"
from the filter definition information in FIG. 13 as the filtering condition corresponding to the "sales result".

To build a filter, which will be put in practical use, from this filter definition information, the attribute value of "charge" corresponding to the employee ID "X04" is required. Thus, from the organization definition information shown in FIG. 11, the filtering execution unit 23 obtains "–" as the attribute value of "charge" corresponding to the person with the employee ID "X04". Because this attribute value "–" is a special value indicating that the attribute value of "charge" is not set, the filtering execution unit 23 does not build a filter, judging that no attribute value is specified for the user with employee ID "X04". Similarly, because no attribute value is specified for "Minami" with the employee ID "X03", the filtering execution unit 23 does not build a filter.

In contrast, when "Kanda" with the employee ID "X14" in FIG. 11b specifies "sales result" as the contents identifier, the filtering execution unit 23 obtains "PC(personal computer)" as the attribute value of "charge" corresponding to employee ID "X14" from the organization definition information in FIG. 11 and builds a filter. Because a filter is built by replacing the part, which is defined as the attribute of the organization definition in the filtering condition, by the actual value, a filter "sales result. product='PC'"
is built for the user with the employee ID "X14".

Next, the filtering execution unit 23 uses management span information, which is included in the organization definition information M31 and which represents the management responsibility range of each post, to check if the user has any subordinate for which the user has management responsibility. This is done in order to add information on the subordinate to the filter (step B8). If the user has no subordinate, the filtering execution unit 23 performs filtering by using the filter built for the user (step B13, filtering execution step); if the user has a subordinate(s), the filtering execution unit 23 obtains the organization definition information M31 corresponding to the subordinate from the organization definition information storage unit 31 (step B9) and checks if a value is allocated to the attribute specified in the filtering condition (step B10). If a value is not allocated, the filtering execution unit 23 performs no operation; if a value is allocated, the filtering execution unit 23 uses the attribute value of the organization definition information of the subordinate to add a condition by connecting with "or" operation to the existing filer(step B11). If no filter is built yet, "or" is omitted.

Next, the filtering execution unit 23 checks if there is a direct or indirect subordinate(s) whose attribute value, which is specified for the filtering condition, is not yet obtained (step B12). If there is a subordinate whose attribute value is not yet obtained, the unit repeats processing in steps B9 to B11. When the attribute values of all direct and indirect subordinates are obtained and the conditions are added to the filter, the filtering execution unit 23 uses a filter finally built to execute filtering for the contents indicated by the contents identifier (step B13) and sends the filtering result M23 to the output device 40 (step B14).

Assuming that the organization definition information in FIG. 11 is stored in the organization definition information storage unit 31 and that the filter definition information in FIG. 13 is stored in the filter definition information storage unit 32, the operation executed by the filtering execution unit 23 in steps B8 to B14 in FIG. 14 will be described more in detail.

As shown in FIG. 11b, "Kitayama" with the employee ID "X04" has subordinates with the employee ID "X05" and employee ID "X06". Therefore, a condition utilizing "video" that is a value of the "charge" attribute of the employee ID "X05" and "TV(television)" that is a value of the "charge" attribute of the employee ID "X06" is added to the filter for the employee ID "X04". Because a value of the "charge" attribute of employee ID "X04" is not set in FIG. 11, the filter for the employee ID "X04" is null. As a result, the final filter includes a condition in which the condition of employee ID "X05" and the condition of employee ID "X06" are connected by "or" as shown below.

"sales result. product='video' or sales result. product='TV'"

Similarly, for "Minami" with the employee ID "X03", a check is made for the "charge" attribute values of the direct subordinates with the employee ID "X10" and employee ID "X13" and for the "chrage" attribute values of the indirect subordinates with the employee IDs "X11", "X12", "X14", and "X15". A filter described below is built by utiliziing information on the employee IDs "X11", "X12", "X14", and "X15" for which attributes values are set.

"sales result. product='telephone' or sales result. product='FAX(facsimile)' or sales result. product='PC' or sales result. product='printer'"

For "Kanda" with the employee ID "X14" who has no subordinate, the final filter is as follows where "charge" attribute value of the employee ID "X14" is used with no condition on subordinates information added to the filter.

"sales result. product='PC'"

FIG. 15 shows the filters finally built by the filtering execution unit 23 for "Kitayama" with the employee ID "X04", "Minami" with the employee ID "X03", and "Kanda" with the employee ID "X14".

FIGS. 17a, 17b, and 17c show the filtering results produced by applying the filter in FIG. 15 for the "Sales result" data in FIG. 16. FIG. 17a shows the execution result (filtering result) for "Kitayama" with the employee ID "X04", FIG. 17b shows the execution result for "Minami" with the employee ID "X03", and FIG. 17c shows the execution result for "Kanda" with the employee ID "X14".

That is, FIG. 17a shows only the information on the products of which are taken charge by the employees with the employee IDs "X05" and "X06" for whom "Kitayama" with the employee ID "X04" has management responsibility. This information is selected from "sales result" shown in FIG. 15 and displayed.

Similarly, FIG. 17b shows only the information on the products of which are taken charge by the employees with the employee IDs "X10", "X11", "X12", "X13", "X14", and "X15" for whom "Minami" with the employee ID "X03" has management responsibility. This information is selected from "Sales result" shown in FIG. 15 and displayed. "Kanda" with the employee ID "X14" has no subordinate and has management responsibility only for himself. Therefore, as shown in FIG. 17c, product information only on the product of which is taken charge by him is selected from "Sales result" in FIG. 15 and displayed.

FIGS. 18a and 18b are diagrams showing the result on which personnel changes or organization changes to the organization definition information in FIGS. 11a and 11b have been reflected, FIG. 19 is a diagram showing the filters that are finally built, and FIG. 20 is a diagram showing the filtering results.

With reference to these figures, how filter definition information is re-used when personnel changes or organization changes are made will be described.

As shown in FIG. 18a, the entries that have been changed from those in FIG. 11 are indicated by "○". That is, "Division C" and "Section C1" have been added to the entries shown in FIG. 11, and the new head of division, new chief of section, and new clerks have been assigned. In addition, as shown in FIG. 18b, "Kitayama" with employee ID "X04" and "Ito" with employee ID "X13" have been exchanged, and "Youda" with the employee ID "X09" has moved from "Section A2" to "Section A1" to be newly in charge of "DVD player".

FIG. 19 shows the finally built filters on the assumption that the organization definition information in FIGS. 18a and 18b is stored in the organization definition information storage unit 31 and that the filter definition information in FIG. 13 is stored in the filter definition information storage unit 32. The filters are those that have been finally built for "Kuroiwa" with the employee ID "X16", "Sato" with the employee ID "X17", "Ito" with the employee ID "X13", and "Kitayama" with the employee ID "X04". For newly-assigned employees, that is, for "Kuroiwa" with the employee ID "X16" and "Sato" with the employee ID "X17", the filters shown in FIG. 19 are generated automatically simply by changing the organization definition information. The filtering result M23 such as the one shown in FIG. 20a is output automatically on the output device 40. Similarly, for "Ito" with the employee ID "X13" who has moved from "Section B2" to "Section A1", the information shown in FIG. 20b, which also includes "DVD player" to be taken charge of by "Youda" with the employee ID "X09", is automatically displayed. For "Kitayama" with the employee ID "X04" who has moved from "Section A1" to "Section B2", the information shown in FIG. 20c which includes only the products for which "Kitayama" must have management responsibility is displayed automatically.

As described above, in accordance with this embodiment, information included in the user's management span is solely filtered, by utilizing management span information stored as the organization definition information M31, from a large volume of information obtained from the enterprise information filtering system and hence the user may have reference solely to the information included in the range in which the user is responsible for management. This method prevents the user from being embarrassed by unnecessary information and contributes to an enhancement of management efficiency. In addition, the organization definition information M31 managed by the personnel division or the like is utilized directly as a filtering condition for selecting information necessary for the user and hence, even if there are personnel changes or organization changes, only the personnel division or the like has to change the organization definition information M31. Then, information may be filtered instantly using the new organization definition information M31. Accordingly, the man-hour required for changing the filter when there are personnel changes or organization changed may be reduced.

In addition, a filter is defined, not dependent on a particular person, but for an attribute constituting a personal job to enable the filter to be re-used within the organization. This method allows the filtering of a predecessor to be used automatically for the successor. At the same time, an integrated management of the filter allows a new filtering function to be made available to all users concerned simply by changing the filter once. This significantly reduces the man-hour required to change the filter when there are personnel changes or organization changes.

While the preferred embodiment of the present invention has been described in detail with reference to the drawings, it is to be understood that the actual configuration is not limited to that used in the embodiment but that changes and variations may be made without departing from the spirit or scope of the invention.

For example, the input device 10 may be a cellular phone or a PDA (Personal Digital Assistant) besides the keyboard of a personal computer. In addition, the output device 40 may be a cellular phone or a PDA besides the display of a personal computer. Also, the input device 10 and the data processor 20, and the output device 40 and the data processor 20, may be connected via the Internet, a cable, or radio waves.

The meritorious effects of the present invention are summarized as follows.

In the configuration of the system in accordance with the present invention, information included in the user's management span is solely filtered, as described above, from information having relation to the inside of an enterprise by using a management span which is managed as a part of organization definition information representing the enterprise internal organization contents, and hence the user may refer only to information included in the range in which the user is responsible for management. This method prevents the user from being bothered and embarrassed by unnecessary information and increases management efficiency. In addition, the organization definition information, which is managed for example by the personnel division or the like, is used directly as a filtering condition for selecting information necessary for the user. Therefore, even if there are personnel changes or organization changes, only the personnel division has to change the organization definition information. Then, information may be filtered instantly using the new organization definition information. As a result, the man-hour required for changing the filter when there are personnel changes or organization changed may be reduced. In addition, a filter is defined, not for a particular person, but for an attribute constituting a personal job to enable the filter to be re-used within the organization. This method allows the filtering of a predecessor to be used automatically for the successor. At the same time, integrated filter management allows a new filtering function to be made available to all users simply by changing the filter once. This significantly reduces the manpower required to change the filter when there are personal changes or organization changes.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. An enterprise information filtering system comprising:
   an organization definition information storage unit that stores organization definition information, which includes information regarding layers of a multi-layered structure of an enterprise, including names of the layers, positions of the layers with respect to other layers and names of persons assigned to the layers and additional information regarding the persons, including management responsibilities;
   a contents storage unit for storing information regarding the performance of the enterprise that is to be filtered by the enterprise information filtering system;
   filter definition information generating means for: identifying a type of information requested by a user of the enterprise information filtering system; correlating the type of information requested by a user of the enterprise information filtering system with a type of organization definition information stored in the organization definition information storage unit; and combining the type of information requested by a user of the enterprise information filtering system and the correlated type of organization definition information to create a filtering condition to be used by the enterprise information filtering system;
   a filter definition information storage unit for storing the filtering condition; and
   filtering means for utilizing the filtering condition and the organization definition information stored in the organization definition information storage unit to build a filter and using the filter to retrieve from information stored in the contents storage unit information pertaining to the request by the user of the enterprise information filtering system and regarding only the user and persons directly and indirectly managed by the user.

2. The enterprise information filtering system as defined in claim 1 wherein, when the user of the enterprise information filtering system is assigned new or different management responsibilities, the filtering means: obtains organization definition information, corresponding to the assignment, from the organization definition information storage unit; utilizes the organization definition information to build the filter; and uses the filter to retrieve from information stored in the contents storage unit information pertaining to the request by the user and regarding only the user and persons directly and indirectly managed by the user.

3. A method for filtering information regarding the performance of an enterprise, comprising the steps of:
   storing in a first storage unit organization definition information, which includes information regarding layers of a multi-layered structure of an enterprise, including names of the layers, positions of the layers with respect to other layers and names of persons assigned to the layers and additional information regarding the persons, including management responsibilities;
   storing in a second storage unit information regarding the performance of the enterprise;
   identifying a type of information requested by a user, correlating the type of information requested by the user with a type of organization definition information stored in the first storage unit, and combining the type of information requested by the user and the correlated type of organization definition information to create a filtering condition;

storing the filtering condition in a third storage unit; and utilizing the filtering condition and the organization definition information stored in the first storage unit to build a filter and using the filter to retrieve from information stored in the second storage unit information pertaining to the request by the user and regarding only the user and persons directly and indirectly managed by the user.

4. The method as defined in claim 3 further comprising the steps of:

when the user of the enterprise information filtering system is assigned new or different management responsibilities, obtaining organization definition information, corresponding to the assignment, from the first storage unit, utilizing the organization definition information to build the filter, and using the filter to retrieve from information stored in the second storage unit information pertaining to the request by the user and regarding only the user and persons directly and indirectly managed by the user.

5. A storage medium storing therein a computer program that causes a computer to execute the steps of:

storing in a first storage unit organization definition information, which includes information regarding layers of a multi-layered structure of an enterprise, including names of the layers, positions of the layers with respect to other layers and names of persons assigned to the layers and additional information regarding the persons, including management responsibilities;

storing in a second storage unit information regarding the performance of the enterprise;

identifying a type of information requested by a user, correlating the type of information requested by the user with a type of organization definition information stored in the first storage unit, and combining the type of information requested by the user and the correlated type of organization definition information to create a filtering condition;

storing the filtering condition in a third storage unit; and utilizing the filtering condition and the organization definition information stored in the first storage unit to build a filter and using the filter to retrieve from information stored in the second storage unit information pertaining to the request by the user and regarding only the user and persons directly and indirectly managed by the user.

6. The storage medium as defined in claim 5 further storing therein a computer program that causes the computer to execute the steps of:

when the user of the enterprise information filtering system is assigned new or different management responsibilities, obtaining organization definition information, corresponding to the assignment, from the first storage unit, utilizing the organization definition information to build the filter, and using the filter to retrieve from information stored in the second storage unit information pertaining to the request by the user and regarding only the user and persons directly and indirectly managed by the user.

* * * * *